(12) United States Patent
Scholz et al.

(10) Patent No.: US 7,659,328 B2
(45) Date of Patent: *Feb. 9, 2010

(54) SILICONE RUBBER

(75) Inventors: Mario Scholz, Gruendau (DE); Juergen Meyer, Stockstadt (DE)

(73) Assignee: Degussa AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/048,869

(22) Filed: Feb. 3, 2005

(65) Prior Publication Data

US 2005/0215668 A1 Sep. 29, 2005

(30) Foreign Application Priority Data

Feb. 3, 2004 (DE) ........................ 10 2004 005 222

(51) Int. Cl.
*C08K 9/06* (2006.01)

(52) U.S. Cl. ..................... 523/212; 524/588; 524/493

(58) Field of Classification Search ................. 524/588, 524/493; 523/212
See application file for complete search history.

(56) References Cited

U.S. PATENT DOCUMENTS

| | | | | |
|---|---|---|---|---|
| 5,847,034 A * | 12/1998 | Achenbach et al. | ............ | 524/91 |
| 5,959,005 A * | 9/1999 | Hartmann et al. | ........... | 523/213 |
| 5,976,480 A | 11/1999 | Mangold et al. | | |
| 6,193,795 B1 * | 2/2001 | Nargiello et al. | ............ | 106/484 |
| 6,194,508 B1 * | 2/2001 | Achenbach et al. | ......... | 524/492 |
| 6,319,974 B1 | 11/2001 | Mangold et al. | | |
| 6,323,262 B1 * | 11/2001 | Achenbach et al. | ......... | 523/343 |
| 6,331,588 B1 | 12/2001 | Azechi et al. | | |
| 6,800,413 B2 * | 10/2004 | Barthel et al. | ............ | 430/108.3 |
| 6,846,865 B2 * | 1/2005 | Panz et al. | ................... | 524/268 |
| 6,887,518 B2 * | 5/2005 | Barthel et al. | ............... | 427/219 |
| 6,956,080 B2 * | 10/2005 | Scholz et al. | ............... | 524/493 |
| 2002/0077412 A1 * | 6/2002 | Kobayashi et al. | .......... | 524/588 |
| 2002/0168524 A1 | 11/2002 | Kerner et al. | | |
| 2003/0162881 A1 | 8/2003 | Panz et al. | | |
| 2003/0195290 A1 | 10/2003 | Scholz et al. | | |
| 2005/0215668 A1 | 2/2005 | Scholz et al. | | |
| 2005/0215696 A1 | 9/2005 | Scholz et al. | | |
| 2006/0017038 A1 * | 1/2006 | Hasenzahl et al. | ............. | 252/2 |
| 2007/0173587 A1 | 7/2007 | Scholz et al. | | |

FOREIGN PATENT DOCUMENTS

| | | |
|---|---|---|
| DE | 43 34 229 A1 | 1/1995 |
| EP | 0 691 364 A3 | 1/1996 |
| EP | 0 900 829 A1 | 3/1999 |
| EP | 1 085 053 A2 | 3/2001 |
| EP | 1 182 168 A1 | 2/2002 |
| WO | WO 03/040048 A2 | 5/2003 |
| WO | WO 2004/033544 A1 | 4/2004 |
| WO | WO 2005/095503 | 10/2005 |

OTHER PUBLICATIONS

U.S. Appl. No. 11/050,198, filed Feb. 3, 2005, Scholz, et al.

* cited by examiner

*Primary Examiner*—Margaret G Moore
(74) *Attorney, Agent, or Firm*—Oblon, Spivak, McClelland, Maier & Neustadt, L.L.P.

(57) ABSTRACT

A composition containing a silicone and one or more silanized, structure-modified, pyrogenic silicas which contain groups fixed to their surface is described. The silicone containing silanized, structure-modified, pyrogenic silicas exhibit advantageous rheological properties, such as lowered crepe hardening, which facilitates the processing operations even after storage or transport of the silicone composition.

16 Claims, 1 Drawing Sheet

- ♦ Comparative Composition 1
- ■ Comparative Composition 2
- ▲ Example Composition 1
- x Example Composition 2

SILICONE RUBBER

CROSS REFERENCES TO RELATED APPLICATIONS

The present application is a non-provisional application claiming priority to German Patent Application No. 10 2004 005 222.0, filed on Feb. 3, 2004, which is incorporated herein by reference in its entirety.

BACKGROUND OF THE INVENTION

1. Field of the Invention

The present invention relates to a composition containing a silicone and a structure modified pyrogenic silica, a method for producing the composition, and an article containing the composition.

2. Discussion of the Background

Silicones possess an unusual combination of properties that are retained over a wide temperature range (−100 to 250° C.). They have very good low temperature flexibility and are very stable to high temperature, oxidation, chemical and biological environments, and weathering. They possess good dielectric strength, and water repellency. Silicone resins are used in applications such as varnishes, paints, molding compounds, electrical insulation, adhesives, laminates, release coatings, sealants, caulks, adhesives, gaskets, tubing, hoses, belts, electrical insulation, encapsulating and molding applications, fabric coatings, encapsulants, and a variety of medical applications. However, many of these above-mentioned applications require improved mechanical properties of the silicone resins.

Silica fillers, such as the pyrogenic silicas described in Winnacker-Küchler Chemische Technologie, Volume 3 (1983) 4$^{th}$ Edition, page 77 and Ullmanns Enzyklopädie der Technischen Chemie, 4$^{th}$ Edition (1982), Volume 21, page 462, are traditionally added to improve the mechanical properties of a silicone, where a high degree of filling may be necessary in order to obtain increased mechanical properties. However, with a high degree of filling, it is difficult to achieve a high degree of dispersion of the fillers in the silicone. This is especially evident when continuous processes, as described in EP A 570387, are used. Additionally, the presence of the silica fillers may lead to undesirable rheological properties such as thixotropic behavior and shortened pot-life.

DE 199 43 666 A1 describes the use of pyrogenic silicas, that have been rendered hydrophobic, as fillers in silicone rubber. U.S. Pat. No. 6,331,588 also describes a silicone rubber containing pyrogenic silicas as fillers. These pyrogenic silicas are treated on the surface to render them hydrophobic to avoid the undesirable effects of the silanol groups, such as thixotropy and shortened pot-life.

As evidenced above, hydrophilic silica fillers are rendered hydrophobic and mixed with the silicone, or alternatively, hydrophilic silica fillers are rendered hydrophobic in situ while mixing with the silicone. However, in both cases, it is necessary to introduce high shear energies via the mixing units in order to achieve a low-viscosity phase. Such processes are very time-consuming and causes significant wear on the equipment. Furthermore, contamination of the silicone with other materials may also occur.

Thus, there remains a need for a silicone composition which provides the improved mechanical properties imparted by the addition of the fillers without the undesirable rheological properties.

SUMMARY OF THE INVENTION

Accordingly, it is one object of the present invention to provide a novel silicone composition which contains silanized, structure-modified pyrogenic silicas having groups fixed to their surface.

It is another object of the present invention to provide a method of producing the novel silicone composition.

A third object of the present invention is to provide an article comprising the novel silicone composition.

These and other objects of the invention, which will become apparent during the following detailed description, have been achieved by the inventors' discovery that if silanized, structure-modified pyrogenic silicon dioxide is incorporated into a silicone, wholly novel properties of the silicone are obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
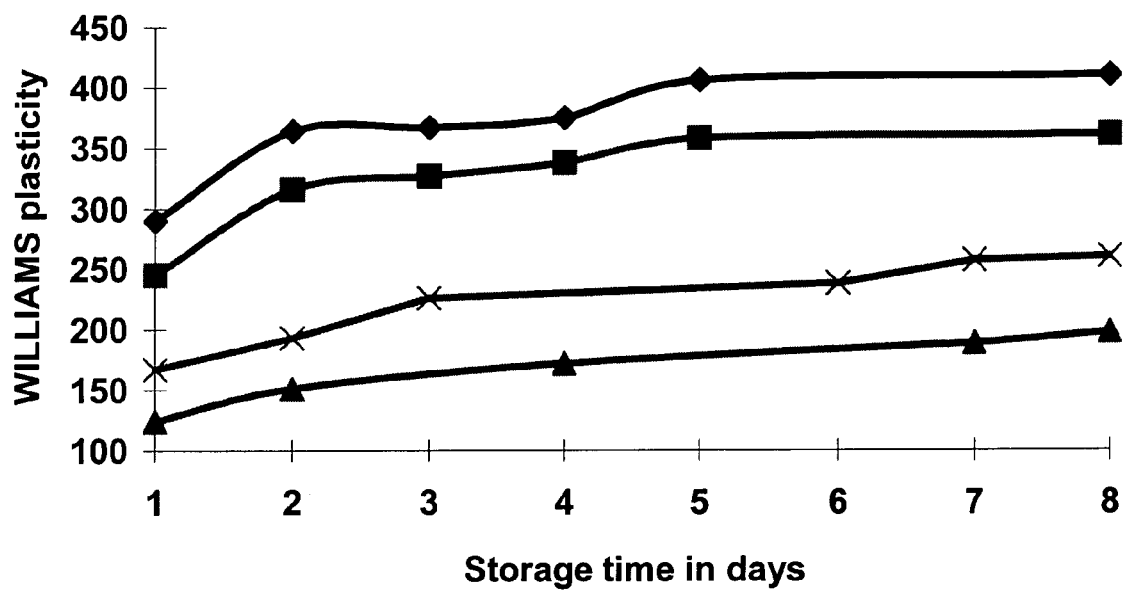
FIG. 1 is a graph of the Williams plasticity of silicones containing 40 wt % silanized, structure-modified pyrogenic silica and silicones containing 40 wt % unmodified pyrogenic silica stored at 50° C. for several days.

Thus, in a first embodiment, the present invention provides a novel silicone composition containing the silanized, structure-modified pyrogenic silica that have groups fixed to their surface. The groups can be dimethylsilyl and/or monomethylsilyl, and is preferably dimethylsilyl.

In a second embodiment of the invention, the silanized, structure-modified pyrogenic silica contained in the silicone composition may have the following physico-chemical characteristics:

| | |
|---|---|
| BET surface area m$^2$/g: | 25-400 |
| mean primary particle size nm: | 5-50 |
| pH value: | 3-10 |
| carbon content %: | 0.1-10 |
| DBP number %: | <200. |

In a third embodiment of the invention, the silanized, structure-modified pyrogenic silica contained in the silicone composition may have a tamped density of from 100 to 280 g/l, preferably from 100 to 240 g/l.

In a fourth embodiment of the invention, the silanized, structure-modified pyrogenic silica contained in the silicone composition is prepared as follows. The pyrogenic silicas are prepared, for example, by flame hydrolysis of vaporizable silicon compounds, such as SiCl$_4$, or organic silicon compounds, such as trichloromethylsilane.

The pyrogenic silica is treated with dimethylchlorosilane and/or monomethyltrichlorosilane. The dimethylsilyl and/or monomethylsilyl groups are fixed to the surface of the pyrogenic silica, followed by structure modification and, optionally milling. Tempering may further be carried out after the structure modification and/or milling.

The structure modification can be carried out using mechanical action such as a ball mill or a continuously operating ball mill. The optional milling can be carried out, for example, by means of an air-jet mill or pinned disk mill. The optional tempering can be carried out batchwise, for example in a drying cabinet, or continuously, for example in a fixed or fluidized bed. Tempering can also be carried out under a protecting gas, such as a nitrogen gas.

In a fifth embodiment of the invention, polydimethylsiloxanes having molecular weights of from 400,000 to 600,000 can be used as the silicone resin. These polydimethylsiloxanes can be prepared with the addition of regulators, such as hexamethyl- or divinyltetramethyl-disiloxane, and carry the corresponding end groups. In order to improve the vulcanization behavior and also the tear-growth resistance, small amounts (less than 1%) of vinyl groups can be incorporated into the main chain as substituents by the addition of vinylmethyldichlorosilane to the reaction mixture. Water-clear, highly viscous self-deliquescing silicone polymers which have a viscosity of from 15 to 30 kPa·s with a chain length of about 10,000 SiO units can also be used as the silicone resin of the present invention.

Crosslinkers, fillers, catalysts, coloring pigments, antiadhesives, plasticizers, and adhesion promoters can also be used as additional constituents of the silicone resin. In particular, plasticizers can establish a low modulus of elasticity. Internal adhesion promoters are based on functional silanes which are able to interact with the substrate and also with the crosslinking silicone polymer. Low molecular weight or monomeric silanol-rich compounds, for example diphenylsilanediol and water, can counteract crepe hardening. They can prevent strong interaction of the silicone resins with the silanol groups of the filler by reacting more rapidly with the fillers. A similar effect can also be achieved by treating (e.g., partially coating) the filler with trimethylsilyl groups.

Silicone can also be chemically modified, such as with phenyl polymers and/or boron-containing polymers. Alternatively, the silicone resins can be blended with organic polymers such as a butadiene-styrene copolymer.

The silicone can be crosslinked in a hot vulcanization process or a cold vulcanization process. The processing temperature of the hot vulcanization is usually in the range of about 140° C. to 230° C., whereas the processing temperature of the cold vulcanization is carried out from about 20° C. to 70° C.

Furthermore, crosslinking can be carried out using peroxidic crosslinking, addition crosslinking, and condensation crosslinking. In particular, peroxidic crosslinking proceeds by way of a free-radical reaction mechanism. The peroxides decompose under the effect of temperature into radicals which attach to the vinyl or methyl groups of the polysiloxanes and produce new radicals there, which then attach to other polysiloxane chains leading to spatial crosslinking. The recombination of two radicals, or the increasingly limited chain mobility as the degree of crosslinking rises, leads to the termination of the crosslinking reaction.

Different peroxides are used depending upon the processing method employed, in order to adapt the rate of crosslinking to the process-specific processing conditions. Examples of such process method include extrusion, injection molding, and compression molding. For example, very high rates of crosslinking may be required for extrusion. However, low rates of crosslinking may be necessary for the production of molded articles by injection or compression molding to avoid the initiation of a crosslinking reaction while the cavity is being filled.

The nature of the peroxide used also has an effect on the structure and physical properties of the crosslinked silicone resin. Diaroyl peroxides, such as bis(2,4-dichlorbenzoyl peroxide) (DCLBP) and dibenzoyl peroxide, crosslink both the vinyl and methyl groups. On the other hand, dialkyl peroxides, such as dicumyl perxide and 2,5(di-tert-butylperoxy)-2,5-dimethylhexane, virtually only crosslink the vinyl groups.

The Shore A hardness of the crosslinked silicone can also be controlled to a certain degree by the amount of peroxide in the silicone resin. As the amount of peroxide increases, the Shore A hardness increases due to the higher density of crosslinking sites. However, an excessive amount of peroxide leads to a decrease in the elongation at break, a decrease in the tensile strength, and a decrease in the tear-growth resistance.

Peroxidic crosslinking can also require subsequent tempering of the crosslinked silicones in order to reduce the permanent set and remove the peroxide cleavage products. Such tempering can remove the aromatic odor that may occur due to the presence of the peroxide cleavage products, especially with dicumyl peroxide, and also prevent a decrease in the physical properties of the crosslinked silicone arising from the presence of the cleavage products.

In a sixth embodiment of the invention, the silicone composition further comprises additional fillers. Fillers can be characterized as reinforcing fillers or non-reinforcing fillers. Fillers which behave as both a reinforcing and non-reinforcing fillers can also be mentioned. Fillers can also exhibit special characteristics to the silicone composition.

Non-reinforcing fillers are characterized by extremely weak interactions with the silicone resin. They include chalk, quartz flour, diatomaceous earth, mica, kaolin, $Al(OH)_3$ and $Fe_2O_3$. The particle diameters are approximately 0.1 μm. Their purpose is to raise the viscosity of the compounds in the unvulcanized state, to increase the Shore A hardness, and to increase the modulus of elasticity of the crosslinked silicones. In the case of surface-treated fillers, improvements in tear strength can also be achieved.

Reinforcing fillers include highly dispersed silicas having a surface area of more than 125 $m^2/g$. The reinforcing action is attributable to the bond that forms between the filler and the silicone resin. Such bonds are formed between the silanol groups at the surface of the silica fillers (3-4.5 SiOH groups/$nm^2$) and the silanol groups of the silicone resin where the hydrogen forms a bridge to the oxygen contained in the chemical structure of the silicone. These filler/silicone interactions result in increases in viscosity and changes in the glass transition temperature and in the crystallization behavior. Furthermore, filler/silicone interactions can lead to an improvement in the mechanical properties. However, they can also result in crepe hardening of the uncrosslinked silicones.

Talcum is an example of a filler that behaves as both a reinforcing and a non-reinforcing filler. Also, fillers used for special effects include iron oxide, titanium dioxide, zirconium oxide or barium zirconate for increasing the heat stability.

The silicone compositions, described above according to the present invention, exhibit advantageous rheological properties. In particular, the Williams plasticity, which is a measure of the viscosity, is markedly lower for the silicone composition containing the structure-modified oxides compared to the silicone composition containing unmodified oxides immediately after incorporation of the silica fillers and after storage at room temperature. This effect is even more pronounced when stored in hot air at 50° C.

The silicones also exhibit superior wetting behavior to the structure-modified oxides as compared to the unmodified oxides. Additionally, replasticizability of the silicone resin composition according to the invention is also superior.

Lastly, the rise in viscosity with storage, known as crepe hardening, is also significantly lower. In particular, a small rise in viscosity over time is very important so that the silicone compositions remain processable even after storage or transport and thus do not require the expensive soft rolling. Therefore, silicone compositions containing the structure-modified oxides, in accordance with the present invention, have considerable advantages over those containing hydrophilic and hydrophobic pyrogenic silicas.

Other features of the invention will become apparent in the course of the following descriptions of exemplary embodiments which are given for illustration of the invention and are not intended to be limiting thereof.

EXAMPLES

Example 1

Preparation and Physico-Chemical Properties of Silica Fillers

Comparative Silica Fillers 1-3 were prepared in the manner described in DE 1 163 784, incorporated in full herein, the same as if set forth at length. AEROSIL® is an example of such Comparative Silica Fillers. In Comparative Silica Fillers 1-3, dimethylsilyl groups were fixed to the surface, but no structure modification was carried out.

Silica Fillers 1-13 were prepared in the manner described in DE 1 163 784, and were subsequently structure-modified by mechanical action. The structure modification can be carried out, for example, using a ball mill or a continuously operating ball mill.

Subsequently, Silica Fillers 5 and 7-13 were milled in a mill, for examples in an air-jet mill or a pinned disk mill.

After the milling, Silica Fillers 8 and 9 were tempered. This tempering can be carried out batchwise, for example in a drying cabinet, or continuously, for example in a fixed or fluidized bed. Furthermore, tempering can be carried out under a protecting gas such as a nitrogen gas. Tables 1 and 2 summarize the preparation and the physico-chemical properties of the Comparative Silica Fillers 1-3 and Silica Fillers 1-13, respectively.

TABLE 1

Preparation of Comparative Silica Fillers 1-3 and Silica Fillers 1-13

| Name | Group fixed to the surface | Structure modification | Milling after structure modification | Tempering after milling |
|---|---|---|---|---|
| Comparative Silica Filler 1 | Dimethylsilyl | No | — | — |
| Comparative Silica Filler 2 | Dimethylsilyl | No | — | — |
| Comparative Silica Filler 3 | Dimethylsilyl | No | — | — |
| Silica Filler 1 | Dimethylsilyl | Yes | No | No |
| Silica Filler 2 | Dimethylsilyl | Yes | No | No |
| Silica Filler 3 | Dimethylsilyl | Yes | No | No |
| Silica Filler 4 | Dimethylsilyl | Yes | No | No |
| Silica Filler 5 | Dimethylsilyl | Yes | Yes | No |
| Silica Filler 6 | Dimethylsilyl | Yes | No | No |
| Silica Filler 7 | Dimethylsilyl | Yes | Yes | No |
| Silica Filler 8 | Dimethylsilyl | Yes | Yes | Yes |
| Silica Filler 9 | Dimethylsilyl | Yes | Yes | Yes |
| Silica Filler 10 | Dimethylsilyl | Yes | Yes | No |
| Silica Filler 11 | Dimethylsilyl | Yes | Yes | No |
| Silica Filler 12 | Dimethylsilyl | Yes | Yes | No |
| Silica Filler 13 | Dimethylsilyl | Yes | Yes | No |

TABLE 2

Physico-chemical properties of Comparative Silica Filler 1-3 and Silica Fillers 1-13

| Name | Tamped density [g/l] | Loss on drying [%] | Ignition loss [%] | pH value | C content [%] | DBP adsorption [%] | Specific surface area according to BET [m²/g] |
|---|---|---|---|---|---|---|---|
| Comparative Silica Filler 1 | 64 | 0.1 | 0.5 | 4.0 | 0.8 | 243 | 113 |
| Comparative Silica Filler 2 | 67 | 0.5 | 0.6 | 4.8 | 1.0 | 256 | 165 |
| Comparative Silica Filler 3 | 72 | 0.7 | 1.0 | 4.0 | 1.6 | 255 | 256 |
| Silica Filler 1 | 236 | 0.1 | 0.6 | 4.0 | 0.8 | 127 | 115 |
| Silica Filler 2 | 204 | 0.1 | 06 | 3.9 | 0.8 | 137 | 116 |
| Silica Filler 3 | 223 | 0.3 | 0.7 | 4.2 | 1.0 | 160 | 169 |
| Silica Filler 4 | 186 | 0.3 | 0.7 | 4.2 | 1.1 | 152 | 171 |
| Silica Filler 5 | 109 | 0.2 | 0.7 | 4.4 | 1.1 | 159 | 167 |

TABLE 2-continued

Physico-chemical properties of Comparative Silica Filler 1-3 and Silica Fillers 1-13

| Name | Tamped density [g/l] | Loss on drying [%] | Ignition loss [%] | pH value | C content [%] | DBP adsorption [%] | Specific surface area according to BET [m²/g] |
|---|---|---|---|---|---|---|---|
| Silica Filler 6 | 193 | 1.2 | 0.7 | 5.2 | 1.7 | 157 | 258 |
| Silica Filler 7 | 125 | 0.2 | 0.7 | 4.1 | 0.8 | 130 | 110 |
| Silica Filler 8 | 140 | 0.5 | 1.6 | 4.7 | 1.7 | 162 | 223 |
| Silica Filler 9 | 123 | 0.3 | 0.5 | 4.3 | 1.1 | 157 | 165 |
| Silica Filler 10 | 102 | 0.7 | 1.2 | 6.2 | 1.7 | 164 | 256 |
| Silica Filler 11 | 160 | 0.2 | 0.7 | 4.0 | 0.8 | 132 | 115 |
| Silica Filler 12 | 152 | 0.2 | 0.6 | 4.1 | 0.8 | 109 | 107 |
| Silica Filler 13 | 219 | 0.6 | 1.0 | 4.9 | 1.3 | — | 129 |

Example 2

Preparation of Silicone Resin Composition Containing 40 wt % Silica Filler

Comparative Silica Fillers A and B, such as AEROSIL®, were used in Comparative Compositions 1 and 2. Silica Fillers A and B were used in Example Compositions 1 and 2. The Comparative Silica Fillers A and B were structure modified as previously described to obtain Silica Fillers A and B. The silica fillers exhibit the following properties.

TABLE 3

Physico-chemical properties of Silica Fillers A and B.

| Name | Tamped density [g/l] | Loss on drying [%] | Ignition loss [%] | pH value | DBP adsorption [wt %] | Specific surface area according to BET [m²/g] | Silica |
|---|---|---|---|---|---|---|---|
| Silica Filler A | 219 | 0.6 | 1.0 | 4.9 | 117 | 129 | 13 |
| Silica Filler B | 140 | 0.5 | 1.6 | 4.7 | 162 | 223 | 8 |

400 g of silicone was introduced into a twin-roller apparatus. As soon as a homogeneous roll sheet was formed on the more rapidly rotating roller (control roller), silica fillers (160 g), shown in Table 3, were added. The silica fillers were added slowly and in portions between the two rollers. After about 50% of the silica was added, the silicone composition was removed from the roller with a scraper and turned over. The remaining 50% of the silica fillers were then added.

In order to disperse and homogenize the silica fillers, rolling was continued for additional 5 minutes after incorporation of the silica fillers. During that time, the silicone composition was turned over five additional times. The silicone composition, prepared in this manner, was stored for one week for wetting of the silica.

The Williams plasticity, which is a measure of the viscosity of the composition, was measured before and after storage. Additionally, the silicone composition was mixed on the twin-roller apparatus until a homogeneous sheet was formed, and the time required to form the homogeneous sheet was determined to be the soft-roll time.

To crosslink the silicone composition, a homogeneous sheet was formed as described above, and DCLBP peroxide was then added with a spatula. Rolling was continued for additional 8 minutes in order to disperse and homogenize the peroxide, during which the silicone composition was removed from the roller with the scraper and turned over 8 times. The silicone composition was stored for 24 hours at room temperature in a PE film. The silicone resin composition was again rolled on the twin-roller apparatus, and the hot press was pre-heated to 140° C. Subsequently, four 2 mm silicone resin composition sheets (pressing time of 7 minutes, 4*50 g of compound) and one 6 mm silicone resin composition sheet (pressing time 10 minutes, 120 g of compound) were crosslinked between two chromium-plated steel plates.

In order to remove the peroxide cleavage products, the sheets were subsequently placed in a hot-air furnace for 6 hours at 200° C. The required test specimens were cut out of the crosslinked sheets using the appropriate stamping irons and were stored under normal conditions. The materials properties of the silicone resin compositions are shown in Table 4.

TABLE 4

Rheology of the silicone resin compositions and the mechanical properties of the crosslinked silicone resin composition containing 40 wt % silica fillers

| | Shore A Hardness | Rebound resilience [%] | Williams plasticity 0 d/7 d | Soft-roll time [minutes] |
|---|---|---|---|---|
| Example Composition 1 | 43 | 51 | 124/135 | 0.5 |
| Comparative Composition 1 | 56 | 49 | 295/253 | 0.5 |
| Example Composition 2 | 48 | 46 | 167/156 | 0.5 |
| Comparative Composition 2 | 53 | 47 | 250/215 | 0.5 |

The results show that the Williams plasticity of Example Compositions 1 and 2 were approximately 50% and 30% lower compared with Comparative Compositions 1 and 2, respectively. This difference was even more pronounced when the silicone compositions were stored at 50° C. for 8 days. This is comparable to storage of the silicone composition for several weeks at room temperature. FIG. 1 shows that Example Compositions 1 and 2 exhibited lower Williams plasticity when compared to Comparative Compositions 1 and 2, respectively. Furthermore, Example Compositions 1 and 2 exhibited a markedly smaller rise in the Williams plasticity when compared to the corresponding Comparative Compositions 1 and 2.

Furthermore, the Williams plasticity immediately after incorporation of the silica fillers and after storage was similar for Examples Compositions 1 and 2, while they decreased after storage in Comparative Example Compositions 1 and 2. This shows that Silica Fillers A and B were nearly completely wetted by the silicone immediately after incorporation, while the wetting of the Comparative Silica Fillers A and B took place only during storage.

Additionally, Shore A hardness of the crosslinked silicone compositions of Example Compositions 1 and 2 were lower than the Shore A hardness of Comparative Compositions 1 and 2, respectively. The rebound resilience of the crosslinked silicone compositions of Example Compositions 1 and 2 were also comparable to the respective Comparative Compositions 1 and 2.

Example 3

Preparation of Silicone Resin Composition Containing 60 wt % Silica Filler

Silicone compositions were prepared in a similar manner as described above, except 60 wt % of the silica fillers were added. These are denoted Example Compositions 3 and 4 and Comparative Compositions 3 and 4. The materials properties of the silicone compositions containing 60 wt % silica filler 4 are shown in Table 5.

TABLE 5

Rheology of the silicone resin compositions and the mechanical properties of the crosslinked silicone resin composition containing 60 wt % silica fillers

| | Shore A Hardness | Rebound resilience [%] | Williams plasticity 0 d/7 d | Soft-roll time [minutes] |
|---|---|---|---|---|
| Example Composition 3 | 56 | 44 | 206/208 | 0.5 |
| Comparative Composition 3 | 73 | 46 | 765/410 | 0.5 |
| Example Composition 4 | 65 | 43 | 315/295 | 4 |
| Comparative Composition 5 | 75 | 46 | 665/502 | 5 |

The Williams plasticity of Example Compositions 3 and 4 were approximately 50% and 40% lower compared with Comparative Compositions 3 and 4, respectively. Comparison of the Williams plasticity immediately after incorporation of the silica fillers and after storage also shows that the wetting of the Example Silica Fillers A and B by the silicone was nearly complete immediately after incorporation, while the wetting of the Comparative Silica Fillers A and B took place only during storage.

Additionally, the soft-roll time, which can be regarded as a measure of the replasticizability of the silicone compositions, was also markedly lower for Example Compositions 3 and 4 compared to Comparative Compositions 3 and 4.

The results also show that the Shore A hardness of the crosslinked silicone compositions of Example Compositions 3 and 4 were lower than the Shore A hardness of Comparative Compositions 3 and 4, respectively. The rebound resilience of the crosslinked silicone compositions of Example Compositions 1 and 2 were also comparable to the respective Comparative Compositions 1 and 2.

Obviously, numerous modifications and variations of the present invention are possible in light of the above teachings. It is therefore to be understood that, within the scope of the appended claims, the invention may be practiced otherwise than as specifically described herein.

The invention claimed is:

1. A composition, comprising:
   a silicone; and
   one or more silanized, structure-modified, pyrogenic silicas;
   wherein:
   the one or more silanized, structure-modified, pyrogenic silicas comprise at least one of dimethylsilyl and monomethylsilyl groups fixed on a surface of the silicas;
   the one or more silanized, structure-modified, pyrogenic silicas are prepared by:
   flame-hydrolyzing one or more vaporizable silicon compounds to obtain a pyrogenic silica;
   treating the pyrogenic silica with at least one member selected from the group consisting of dimethylchlorosilane and monomethyltrichlorosilane to obtain a silanized, pyrogenic silica; and
   structure-modifying the silanized, pyrogenic silica to obtain the silanized, structure-modified, pyrogenic silica;
   the one or more silanized, structure-modified, pyrogenic silicas are present in the composition in an amount of at least 40% by weight based on a total weight of the composition; and
   the silicone is a polydimethylsiloxane having a molecular weight of from 400,000 to 600,000.

2. The composition according to claim 1, wherein said one or more silanized, structure-modified, pyrogenic silicas have the following physico-chemical characteristics:

| | |
|---|---|
| BET surface area m$^2$/g: | 25-400 |
| mean primary particle size nm: | 3-50 |
| pH value: | 3-10 |
| carbon content %: | 0.1-10 |
| DBP number %: | <200. |

3. The composition according to claim 1, wherein said silica has a tamped density of from 100 to 280 g/l.

4. The composition according to claim 1, wherein said structure-modifying is carried out using a ball mill or by a continuously operating ball mill.

5. The composition according to claim 1, wherein said silanized, structure-modified, pyrogenic silica is further milled by an air jet mill or a pinned disk mill.

6. The composition according to claim 1, wherein said silanized, structure-modified, pyrogenic silica is further tempered in a drying cabinet or in a fixed or fluidized bed.

7. The composition according to claim 1, wherein said silicone is a water-clear, self-deliquescing silicone polymer having a viscosity of from 15 to 30 kPa-s.

8. The composition according to claim 1, wherein said composition further comprises at least one member selected from the group consisting of a crosslinker, a filler, a catalyst, a coloring pigment, an antiadhesive, a plasticizer, and an adhesion promoter.

9. The composition according to claim 1, wherein said silicone is crosslinked.

10. The composition according to claim 9, wherein said silicone is crosslinked by peroxidic crosslinking, addition crosslinking or condensation crosslinking.

11. The composition according to claim 9, wherein said silicone is crosslinked by peroxidic crosslinking with a diaroyl peroxide or a dialkyl peroxide.

12. The composition according to claim 8, wherein said filler is a non-reinforcing filler, a reinforcing filler, a filler having both a non-reinforcing and reinforcing properties, or a filler which increases the heat stability of said composition.

13. The composition according to claim 1, wherein said composition further comprises one or more low molecular weight or monomeric silanol-containing compounds.

14. The composition according to claim 1, wherein said composition further comprises one or more organic polymers.

15. A method of producing said composition according to claim 1, said method comprising:
incorporating said one or more silanized, structure-modified, pyrogenic silica into said silicone.

16. An article comprising said composition according to claim 1.

* * * * *